(12) United States Patent
Kinsley, Jr.

(10) Patent No.: US 6,517,675 B2
(45) Date of Patent: Feb. 11, 2003

(54) PROCESS FOR MAKING METAL FIBER/METAL POWDER SHEET

(75) Inventor: Homan B. Kinsley, Jr., Powhatan, VA (US)

(73) Assignee: FiberMark, Inc,, Brattleboro, VT (US)

( * ) Notice: Subject to any disclaimer, the term of this patent is extended or adjusted under 35 U.S.C. 154(b) by 0 days.

(21) Appl. No.: 09/983,847

(22) Filed: Oct. 26, 2001

(65) Prior Publication Data

US 2002/0096279 A1 Jul. 25, 2002

Related U.S. Application Data

(62) Division of application No. 09/356,334, filed on Jul. 19, 1999, now Pat. No. 6,346,168, which is a continuation of application No. 08/828,544, filed on Mar. 31, 1997, now abandoned.

(51) Int. Cl.⁷ .............................................. D21H 13/48
(52) U.S. Cl. ....................... 162/145; 162/146; 162/152; 162/157.1
(58) Field of Search ................................. 162/141, 145, 162/142, 146, 147, 152, 157.1

(56) References Cited

U.S. PATENT DOCUMENTS

| | | |
|---|---|---|
| 3,127,668 A | 4/1964 | Troy |
| 4,265,703 A * | 5/1981 | Terliska ........................ 162/146 |
| 4,748,075 A * | 5/1988 | Beyer et al. ................. 428/221 |
| 5,244,721 A | 9/1993 | Wyche et al. |

FOREIGN PATENT DOCUMENTS

GB 2 118 925 11/1983

OTHER PUBLICATIONS

Arledter, H.F, "Metal Fibers", 1964, Interscience Publishers, Chapter 6, pp. 118–181.*

Database Paperchem, The Institute of Paper Science and Technology, Atlanta, GA., U.S.; Murakami, K., "Manufacture of Filter", XP002125322; Patent Abstracts of Japan, vol. 1995, No. 1, Feb. 28, 1995 & JP 06 277422A (Filtration Co. Ltd.), Oct. 4, 1994.

Database Paperchem, The Institute of Paper Science and Technology, Atlanta, GA., U.S; Ohi, T., et al., "Manufacture of Metal Fiber Sheet", XP002125324 & JP 61 289200A, Dec. 19, 1986.

Battista O A: "Synthetic Fibers in Papermaking", 1964 XP002911755, Chapter 6, H.F. Arledter, pp. 118–121, 144, 145, 156–171, 180–184.

* cited by examiner

Primary Examiner—Dean T. Nguyen
(74) Attorney, Agent, or Firm—Burns, Doane, Swecker & Mathis, L.L.P.

(57) ABSTRACT

Provided by the present invention is a wet-layed, nonwoven sheet which is comprised of metal fiber and metal powder. Generally, the amount of metal fiber comprises from 20 to 95% by weight and the amount of metal comprises from 5 to 80% by weight of the sheet. Such a wet-layed nonwoven sheet is economically preferable to a sheet comprised totally of metal fiber, since the metal powder is much less expensive. Among other factors, the present invention is based upon the recognition that by using various process techniques, the combination of metal fiber and metal powder can be wet-layed to obtain a structure of sufficient strength for subsequent handling and sintering.

18 Claims, 1 Drawing Sheet

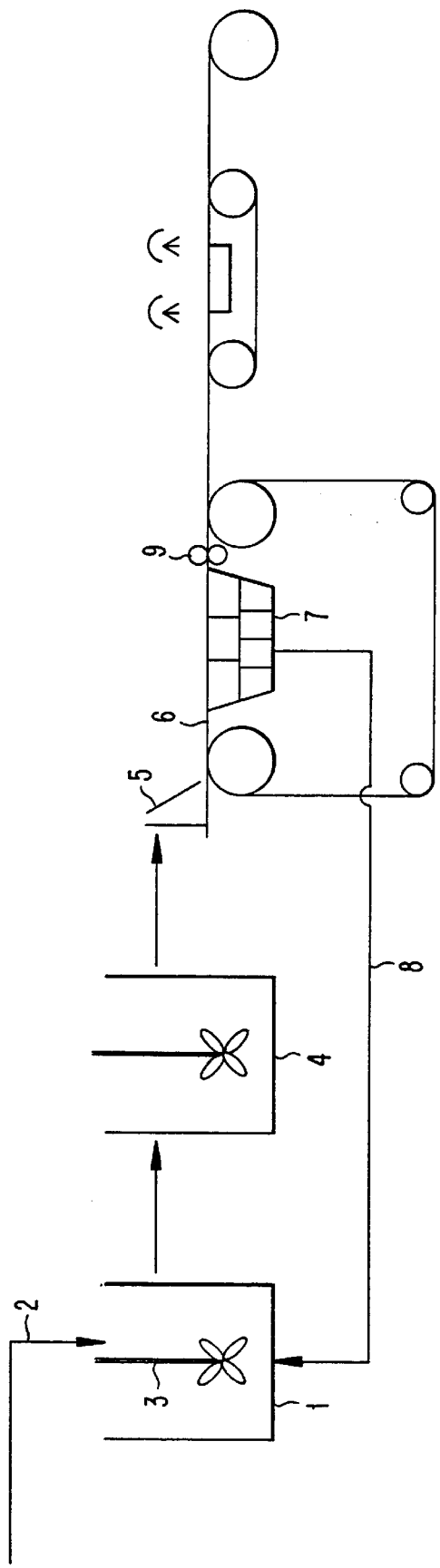

PROCESS FOR MAKING METAL FIBER/METAL POWDER SHEET

This application is a divisional of application Ser. No. 09/356,334, filed Jul. 19, 1999, now U.S. Pat. No. 6,346,168 which is a continuation of application Ser. No. 08/828,544, filed on Mar. 31, 1997 now abandoned.

BACKGROUND OF THE INVENTION

The present invention relates to a process for making a wet-layed metal fiber nonwoven sheet which also contains metal powder. In particular, the present invention relates to a process for making a metal fiber/metal powder sheet.

Papers comprised primarily of metal fibers have been desired by the industry for many years. Various methods have been developed for the preparation of metal fiber sheets. The manufacture of metal fiber nonwoven fabric-like paper structures on papermaking equipment has also been actively pursued due to its commercial attractiveness. Interest in such techniques is described, for example, in the chapter on metal fibers by Hanns F. Arledter in *Synthetic Fibers in Papermaking,* Editor O. Balestra, chapter 6, pages 118–184.

The problem in making metal fiber sheets using conventional papermaking techniques is that the metal fibers tend to clump together. Before paper can be made, it is necessary to open fiber bundles to achieve individual fibers and to disperse the fibers uniformly in a fluid. With most wood pulps, the opening is not usually a difficult task. The pulp or source of fibers is placed in water and the mixture is sheared until the bundles open.

With metal fibers, however, both the opening of the bundles and the dispersion of the fibers in order to keep the fibers separated are difficult. Normal types of mixing or shearing devices can easily damage metal fibers. When metal fibers are bent, they will remain bent and eventually will interact to form balls of tangled fibers. Paper made from fibers in this form is unacceptable.

It would be of great advantage to the industry, therefore, if a process for making a metal fiber sheet using conventional papermaking techniques, i.e., a wet-laying technique, can be used. Such a process should offer efficiency and commercial viability in terms of cost.

Moreover, the cost of a metal fiber sheet can be prohibitive. A metal sheet which is made of metal fiber but is more cost effective would also be attractive. A sheet containing metal fiber and metal powder would be such a sheet.

Accordingly, it is an object of the present invention to provide a metal fiber sheet which also contains a metal powder.

Yet another object of the present invention is to provide a process for making such a metal fiber/metal powder sheet using a wet laying technique.

These and other objects of the present invention will become apparent upon a review of the following specification, the figure of the drawing, and the claims appended hereto.

SUMMARY OF THE INVENTION

In accordance with the foregoing objectives, provided by the present invention is a wet-layed, nonwoven sheet which is comprised of metal fiber and metal powder. Generally, the amount of metal fiber comprises from 20 to 95% by weight and the amount of metal powder comprises from 5 to 80% by weight of the sheet. Such a wet-layed nonwoven sheet is economically preferable to a sheet comprised totally of metal fiber, since the metal powder is much less expensive. Among other factors, the present invention is based upon the recognition, using various process techniques, that the combination of metal fiber and metal powder can be wetlayed to obtain a structure of sufficient strength for subsequent handling and sintering.

In a preferred embodiment, the wet-layed nonwoven sheet comprised of metal fiber and metal powder is made by a process which involves first dispersing metal fibers and the metal powder into an aqueous dispensing fluid which contains a non-carboxy containing water soluble polymer. The aqueous dispensing fluid is then applied onto a screen, with the aqueous dispensing fluid then being removed to thereby form the metal fiber/metal powder sheet.

In another preferred embodiment, the wet-layed, nonwoven metal fiber/metal powder sheet of the present invention is made by a process which comprises first dispersing a mixture of the metal fiber, metal powder, wood pulp and a fibrillated material into an aqueous dispensing fluid. Generally, the amount of metal fiber and metal powder together ranges from 60 to 80 weight percent based upon the solids, the amount of wood pulp ranges from about 15 to about 30 weight percent, and the amount of fibrillated material ranges from about 5 to 15 weight percent based upon the weight of solids. The aqueous dispensing fluid is then applied onto a screen, and the fluid is removed to provide a metal fiber/metal powder sheet.

BRIEF DESCRIPTION OF THE FIGURE OF THE DRAWING

The FIGURE of the Drawing schematically depicts the process of the present invention useful in making a metal fiber/metal sheet by a wet-laying technique.

DETAILED DESCRIPTION OF THE PREFERRED EMBODIMENTS

In one preferred embodiment, the process of the present invention employs a non-carboxy containing water soluble polymer to aid in dispersing metal fibers into an aqueous dispensing fluid. The dry metal fibers, together with the metal powder, are added to an aqueous dispensing fluid, to which the non-carboxy containing water soluble polymer is also added. Through mixing, the metal fibers and metal powder are dispersed in the presence of the non-carboxy containing water soluble polymer.

Among the water soluble polymers useful for the present invention are polyvinyl alcohol, starch or cellulose ethers.. Generally, the water soluble polymer comprises from 1 to 5 weight percent of the aqueous dispensing fluid. In a preferred embodiment, starch is apt the water soluble polymer used as the dispersing aid, and is generally used in an amount ranging from 3 to 4 weight percent based upon the weight of aqueous dispensing fluid.

The water soluble polymer can be added directly to the aqueous dispensing fluid, generally before the metal fiber is added. This will allow the water soluble polymer to immediately begin to interact with the dry fiber. While the water soluble polymer allows the dry fiber to disperse, it also aids in the formation of the metal fiber web by maintaining separation of the metal fibers. The fact that such a small amount of a water soluble polymer such as starch can be used to effectively maintain separation is quite surprising.

In another preferred embodiment, the process of the present invention employs a combination of wood fibers and fibrillated material to aid in dispersing metal fibers into an aqueous dispensing fluid. The dry metal fibers are added together with the wood fibers and fibrillated material to the aqueous dispensing fluid. Through mixing, the metal fibers, wood fibers and fibrillated material are dispersed.

More specifically, the wood fibers can be any conventional wood fiber, such as softwood or hardwood fibers. Mixtures of wood fiber, including mixtures of softwood and hardwood fibers, can be used. Softwood fibers, however, are preferred. The amount of wood pulp fibers used generally ranges from about 15 to 30 weight percent.

Together with the wood pulp, a fibrillated material is used. Fibrillated materials are known in the industry, and are generally referred to as fibrids. The materials are high surface area materials of a surface area in the range of from about 5–20 $m^2/g$. This is in contrast to wood pulp, which generally has a surface area in the range of from about ½–2 $m^2/g$. The fibrillated material can be made by any conventional method, with the use of organic materials being most preferred.

It has been found that a combination of the wood pulp with the fibrillated material provide for an excellent metal fiber dispersion and the making of an excellent metal fiber sheet. Cellulon and Kevlar fibrids, both available commercially, are the most preferred fibrillated materials for use in the present invention. Another suitable material is a cellulose acetate fibrid commercially available under the mark FIBRET, available from Hoechst/Celanese Co. The amount of fibrillated material used generally ranges from 5 to 15 weight percent.

The presence of the fibrillated material has been found to be very important with regard to the present invention. It is important to generate an aqueous slurry comprised of the wood pulp and the fibrillated material. The slurry is preferably generated generally by the use of a high shear and a high energy agitator. Such agitators are well known. Colloid mills, such as the ones available from Silverson, have been found suitable.

The metal fibers are dispersed in the aqueous slurry of the high surface area material by using a non-stapling mixer, as is well understood in the industry. In general, such a mixture would have a leading surface larger in width, height and/or diameter than the length of the metal fibers. It is important to provide sufficient shear to break up the metal fiber bundles but it is equally critical to avoid bending the fibers and creating fiber aggregates. If the metal fiber aggregates are allowed to form by the application of too much mixing energy it is very difficult to re-disperse them.

Although it is possible to disperse the metal fibers in a slurry composed only of water and a high surface area material like bacterial cellulose, there are advantages to incorporating wood pulp in this slurry. We have observed that the presence of wood pulp improves the paper making characteristics like uniformity of the dispersion, the wet web strength, and the dry strength.

The metal fibers can be any useful metal fiber, with nickel and stainless steel fibers being most preferred. The stainless steel fibers can, for example, be stainless steel 304 fibers, stainless steel 316 fibers or stainless steel Hastelloy X fibers. Nickel and stainless steel fibers are most preferred because their potential uses are exceptional. The metal powder used can be of the same or different metal than that of the metal fibers, and can be made by any conventional method. It is preferred that nickel powder is used, particularly when nickel fiber is used. Suitable nickel powders are available commercially, for example, from INCO Specialty Powder Products of Wyckoff, N.J. Such suitable powders include, for example, the INCO extra fine Nickel Powder TYPE 210, which is a submicron size filamentary powder. It is produced by the thermal decomposition of nickel carbonyl and is virtually free of other metallic impurities. Other suitable nickel powders, and other metal powders, are also available from INCO.

Conventional additives can also be added to the aqueous dispensing fluid. Such additives would include, for example, a biocide to inhibit microorganism growth in dispensing fluid. Other conventional additives can also be added.

Once the metal fibers have been dispersed in the aqueous dispensing fluid, the dispensing fluid is then applied to a screen as is conventional in papermaking process. The aqueous dispensing fluid is then removed in order to form the metal fiber sheet. Generally this is done through vacuum suction of the fluid through the screen. In a preferred embodiment, the process of the present invention is conducted in a closed system where the dispensing fluid removed from the metal fibers is recycled and reused.

Turning now to the FIGURE of the Drawing, a mixing vessel 1 contains the aqueous dispensing fluid together with the non-carboxy containing water soluble polymer such as starch. The dry metal fiber is added via 2 into the dispensing fluid. Mixing is achieved by a stirrer 3. Generally, the mixer 3 is an agitator that does not induce fiber stapling, as is known in the art. The mixing continues until the desired fiber separation is achieved.

In a preferred embodiment, the aqueous dispensing fluid containing the dispersed metal fibers is passed to a second mixing tank 4. The additional mixing is optional, but does insure good formation in the subsequent sheet. It is therefore preferred that a plurality of such mixing tanks be employed to insure good dispersion and formation of the metal sheet.

The aqueous dispensing fluid is then passed to a headbox 5, through which the aqueous dispensing fluid containing the metal fibers is applied to a continuous screen 6. A vacuum system 7 is generally used to remove the aqueous dispensing fluid in order to form the metal fiber sheet on the screen. In a preferred embodiment, the removed aqueous dispensing fluid is then recycled to the mixing tank 1 via line 8. Generally, about 60 weight percent of the metal powder is retained in the metal fiber sheet using the non-carboxy water soluble polymer.

The formed metal fiber sheet is then passed through press rolls, can then be calendared and dried as is conventional in the papermaking industry. Despite the use of such a small amount of water soluble polymer, the residue is sufficient to provide sufficient strength to the metal fiber sheet so that such subsequent handling can occur without incident.

The final step is a sintering step which can be conducted at optimum temperatures in an inert or reducing atmosphere. The sintering step introduces a strength to the metal fiber paper, as well as burns off the various organics contained in the metal fiber paper. The sintering step generally involves heating the paper at a temperature of from 1500–1200° F. for a time necessary to burn off the organics. The sintering step is preferably conducted in a hydrogen atmosphere. If desired, a prior pyrolysis step can be conducted at a lower temperature to initially burn off organics. However, the pyrolysis step does not impart the necessary strength to the paper, and should be followed by the sintering step at the higher temperature of from 1500–2000° F. to burn off any remaining organics and to provide the desired strength to the paper. The resulting fiber paper contains at least about 99 weight percent metal.

Turning now to the FIGURE of the Drawing, a mixing vessel 1 contains the aqueous dispensing fluid together with any desired additives. The dry metal fiber is added via 2 into the dispensing fluid, together with the wood pulp and fibrillated material in the desired amounts. Mixing is achieved by a stirrer 3. Generally, the mixer 3 is an agitator that does not induce fiber stapling, as is known in the art. The mixing continues until the desired fiber separation is achieved.

In a preferred embodiment, the aqueous dispensing fluid containing the dispersed metal fibers is passed to a second mixing tank 4. The additional mixing is optional, but does insure good formation in the subsequent sheet. It is therefore preferred that a plurality of such mixing tanks be employed to insure good dispersion and formation of the metal sheet.

The aqueous dispensing fluid is then passed to a headbox 5, through which the aqueous dispensing fluid containing the metal fibers is applied to a continuous screen 6. A vacuum system 7 is generally used to remove the aqueous dispensing fluid in order to form the metal fiber sheet on the screen. In a preferred embodiment, the removed aqueous dispensing fluid is then recycled to the mixing tank 1 via line 8.

The formed metal fiber sheet is then passed through press rolls, and can then be calendared and dried as is conventional in the papermaking industry. The metal fiber sheet has sufficient strength to permit subsequent handling to occur without incident.

The final step is a sintering step which can be conducted at optimum temperatures in an inert or reducing atmosphere. The sintering step introduces a strength to the metal fiber paper, as well as burns off the various organics, i.e., the wood pulp and the fibrillated material, contained in the metal fiber paper. The resulting fiber paper contains at least about 95 weight percent metal, and most preferably about 99 weight percent.

The resulting metal fiber sheet is useful in many different applications. For example, the metal fiber sheet can be used as a battery electrode. Nickel fiber is preferred for such an application. The metal fiber sheets can also be used as fluid filters. The filters can be useful for hydraulic fluids, water or oil. The metal fiber sheets can also be used as gas filters, for example in the filtering of air or exhaust gases. The applications are many, and with the use of the present invention in the preparation of metal fiber sheets, the availability of such sheets in an economic fashion will be increased.

The invention will be illustrated in greater detail by the following specific examples. It is understood that these examples are given by way of illustration and are not meant to limit the disclosure or the claims to follow. All percentages in the examples, and elsewhere in the specification, are by weight unless otherwise specified.

EXAMPLE 1

8 oz/sq yd metal handsheets were made. The handsheets contained 10% Ni fiber and 50% Ni powder. The basis weight of the 8 oz/sq yd handsheets was equal to 166.6 lb/3000 sq. ft. Total basis weight was (166.6/0.60) or 278 lb/3000 sq ft. This is equal to 57 grams per 14×14 handsheet.

The following materials were used in making the handsheets:

| | |
|---|---|
| 10% Ni fiber 0.25 inch × 8 micron | 5.72 g Oven Dry |
| 50% Ni powder (Int Nickel Grade 225) | 28.6 g Oven Dry |
| 20% Kevlar pulp | 11.4 g OD or 62.2 at 18.4% solids |
| 20% Northern Hardwood pulp | 11.4 g OD or 12 g at 95% solids |

The general procedure followed was:

Blend Kevlar pulp in 1 liter water in a Waring blender for 3 min at high. Blend the N. Hardwood pulp in 1 liter of water in a Waring blender for 3 min at high. All ingredients were mixed in a 5 gal baffled pot with 8 inch foil blade at 590 RPM for 5 min. No surfactants or binders were added. The handsheet, was formed with no pressing. About 80% retention of Ni powder was observed. The sheet contained about 7.75 oz of Ni (powder and fiber) per sq yd.

A paper where all of the nickel was in powder form was also attempted. The paper would not hold up during sintering if the metal fiber was missing from the recipe. In this experiment, the nickel fiber improved the strength of the paper during the sintering process.

EXAMPLE 2

A 6 oz/sq yd or 125 lb/ream or 25.73 g/14×l4 handsheet was made. It was decided to actually use 28.6 g per handsheet to allow for powder loss. The following materials were used:

| Material | Percent, OD | Mass, g (OD) | Mass, g (As Is) |
|---|---|---|---|
| Ni Powder | 50 | 14.3 | 14.3 |
| Ni Fiber (8 micron,) .25 inch | 11 | 3.15 | 3.15 |
| No. Softwood pulp | 16 | 4.58 | 4.90 |
| No. Hardwood pulp | 16 | 4.58 | 4.90 |
| Cellulon | 7 | 2 | 10.5 |

All ingredients were added to a5 gal baffled pot with 4 liters of water. Mixing occurred for 3 min at 540 RPM with a ¾ inch×9 inch foil agitator. 4 ml of a 1% cationic coagulation aid (Nalco 7520) was added to assist in the retention of the powder. Handsheet was formed with no further dilution, which was pressed with roll weight only. Three handsheets were made, which had an oven dry mass of 28.7, 28.8, and 28.9 grams, respectively.

EXAMPLE 3

National Starch's branched starch (amylopectin) known by the trade name Amioca, was used to make a solution about 3% in strength which had a viscosity of 30 centipoise. Four liters of this solution was added to a baffled 5 gallon pot. To this was added the ingredients listed below.

|  | Metal fiber, 4 micron by 4 mm long | Nickel powder, INCO 255 (2.2–3.3 micron) |
|---|---|---|
| Handsheet 1 | 4.13 grams | 4.13 grams |
| Handsheet 2 | 4.13 grams | 41.30 grams |

The mixture was stirred with a nine inch foil blade at 1280 RPM for 45 seconds. A single drop of DOW A defoamer was added. The resulting fiber-powder mixture was poured into an eight inch by eight inch handsheet mold with no further dilution. Handsheet 1 was dried and weighed. The sheet retained about 5% starch, so the dry sheet contained about 9% powder, 5% starch, and about 86% metal fibers. Of the metal powder added, about 11% was retained.

Sheet 2 was also dried and weighed. It contained about 5% starch, thus the powder content was 70% and the metal fiber content was 25%. Of the powder added, about 25% was retained.

No retention aids like cationic polymers or alum solution were added:to either handsheet.

While the invention has been described with preferred embodiments, it is to be understood that variations and modifications may be resorted to as will be apparent to those skilled in the art. Such variations and modifications are to be considered within the purview and the scope of the claims appended hereto.

What is claimed is:

1. A process for making a wet-layed, non-woven metal fiber containing sheet which comprises
   (a) dispersing a mixture of metal fiber, metal powder, wood pulp and a fibrillated material into an aqueous dispensing fluid, with the mixture being dispersed by first creating a slurry of wood pulp and fibrillated material, and then adding the metal fiber and metal powder to the slurry of wood pulp and fibrillated material, with the amount of metal fiber and metal powder ranging from 60 to 80 weight percent, the amount of wood pulp ranging from about 15 to about 30 weight percent, the amount of fibrillated material ranging from about 5 to 10 weight percent;
   (b) applying the aqueous dispensing fluid with the dispersed mixture onto a screen, and
   (c) removing the aqueous dispensing fluid to thereby form a metal fiber/metal powder comprising sheet.

2. The process of claim 1, wherein the fibrillated material is comprised of Cellulon or a synthetic fibrid.

3. The process of claim 1, wherein the fibrillated material is comprised of Cellulon.

4. The process of claim 1, wherein the fibrillated material is comprised of a synthetic fibrid.

5. The process of claim 4, wherein the synthetic fibrid is cellulose acetate.

6. The process of claim 1, wherein the wood pulp employed is a mixture of hard wood and soft wood.

7. The process of claim 6, wherein the ratio of hard wood to soft wood in the mixture of the wood pulp is in the range of 40:60 to 60:40.

8. The process of claim 1, wherein the metal fiber is comprised of stainless steel or nickel fiber and the metal powder is comprised of stainless steel or nickel powder.

9. The process of claim 1, further comprising sintering the metal fiber containing sheet.

10. A process for making a wet-layed, non-woven metal fiber containing sheet which comprises
    (a) dispersing a mixture of metal fibers, metal powder, wood pulp and a fibrillated material into an aqueous dispensing fluid, with the mixture being dispersed by first creating a slurry of the fibrillated material, and then adding the wood pulp, metal fiber and metal powder to the slurry of fibrillated material, with the amount of metal fiber and metal powder ranging from 60 to 80 weight percent, the amount of wood pulp ranging from about 15 to about 30 weight percent, the amount of fibrillated material ranging from about 5 to 10 weight percent;
    (b) applying the aqueous dispensing fluid with the dispersed mixture onto a screen, and
    (c) removing the aqueous dispensing fluid to thereby form a metal fiber/metal powder comprising sheet.

11. The process of claim 10, wherein the fibrillated material is comprised of Cellulon or a synthetic fibrid.

12. The process of claim 10, wherein the fibrillated material is comprised of Cellulon.

13. The process of claim 10, wherein the fibrillated material is comprised of a synthetic fibrid.

14. The process of claim 10, wherein the synthetic fibrid is cellulose acetate.

15. The process of claim 10, wherein the wood pulp employed is a mixture of hard wood and soft wood.

16. The process of claim 10, wherein the ratio of hard wood to soft wood in the mixture of the wood pulp is in the range of 40:60 to 60:40.

17. The process of claim 10, wherein the metal fiber is comprised of stainless steel or nickel fiber and the metal powder is comprised of stainless steel or metal powder.

18. The process of claim 10, further comprising sintering the metal fiber containing sheet.

* * * * *